United States Patent [19]

Brown et al.

[11] 4,378,287

[45] Mar. 29, 1983

[54] WAX PRODUCT

[75] Inventors: John A. Brown, Otley; Leslie R. Wilkie, Bradford, both of England

[73] Assignee: Numol Corporation, Gastonia, N.C.

[21] Appl. No.: 952,929

[22] Filed: Oct. 19, 1978

Related U.S. Application Data

[62] Division of Ser. No. 729,363, Oct. 4, 1976, abandoned, which is a division of Ser. No. 625,601, Oct. 24, 1975, Pat. No. 4,086,046.

[51] Int. Cl.$^3$ .............................................. C10G 73/36
[52] U.S. Cl. ...................................... 208/20; 428/375; 428/484
[58] Field of Search .................... 428/484, 375; 208/20

[56]  References Cited

U.S. PATENT DOCUMENTS

| 22,921 | 2/1859 | Leonard | 264/28 |
|---|---|---|---|
| 1,789,052 | 1/1931 | Pfanstiehl | 428/396 |
| 2,457,088 | 12/1948 | Pinney | 264/28 |
| 2,709,278 | 5/1955 | Greer | 264/348 |

*Primary Examiner*—George F. Lesmes
*Assistant Examiner*—E. Rollins Buffalow
*Attorney, Agent, or Firm*—Bell, Seltzer, Park & Gibson

[57]  ABSTRACT

A method of making wax articles and lubricity to textile yarns in which paraffin wax having a particular melting temperature is heated to a temperature above the melting temperature and thereby melted. A mold is then filled with a molten wax while being chilled to a temperature. Thereafter, the mould and the wax in the mould are heated to a temperature substantially the same as the melting temperature and the wax is subsequently removed from the mould. The sequenced chilling and heating impart to the moulded wax a particular molecular structure which enhances lubricity.

1 Claim, 4 Drawing Figures

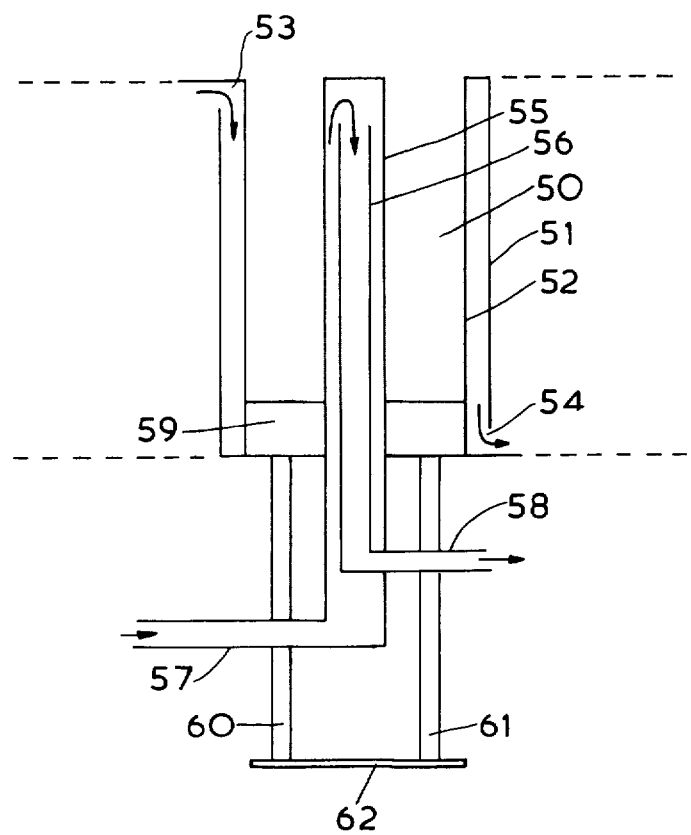
-FIG. 3.-

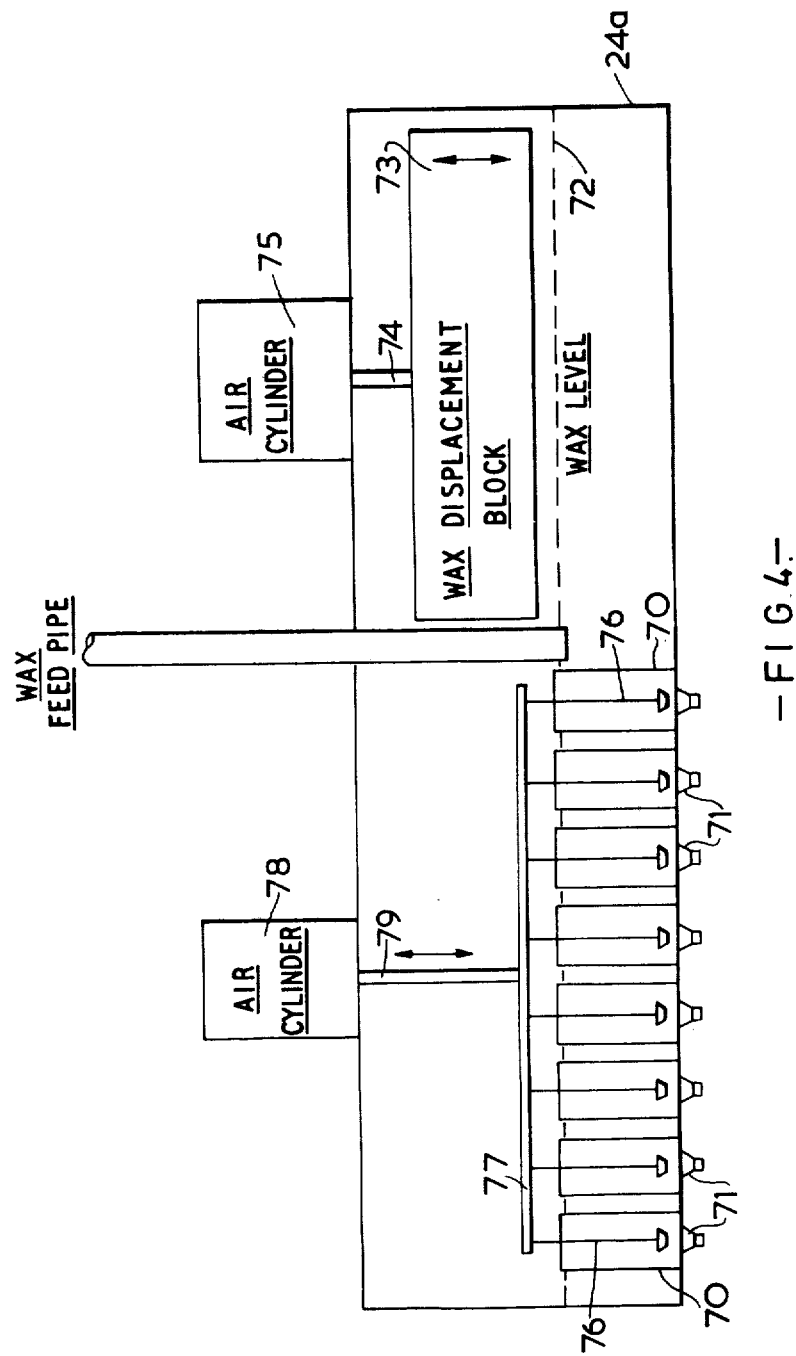

WAX PRODUCT

This is a division of Ser. No. 729,363, filed Oct. 4, 1976, and now abandoned, which in turn is a division of Ser. No. 625,601, filed Oct. 24, 1975 and now U.S. Pat. No. 4,086,046.

BACKGROUND TO THE INVENTION

The invention relates to waxes such as paraffin wax, and to articles moulded therefrom, in particular, but not exclusively, wax rings for use in the lubrication of yarns in knitting machines.

DESCRIPTION OF THE PRIOR ART

It is know to mould articles from paraffin wax by pouring molten wax into moulds and allowing it to solidify. Wax rings are at present manufactured in this way, wax being poured by hand into a plurality of ring-like moulds, which are emptied by hand after the wax has cooled.

SUMMARY OF THE INVENTION

The Applicant has discovered that wax rings can be made very quickly and efficiently by machine, but it has also been found, very surprisingly, that the wax rings produced by the machine have better lubricating properties than those produced previously. It is believed that the operations to which the wax is subjected in the machine cause its molecular structure to be altered in a way which is beneficial to the lubricating properties. Tests carried out in the Textile Department of the University of Leeds using X-ray diffraction analysis have shown clearly that the structure of the wax differs from the known waxes and it appears that probably the most important factor in the change of molecular structure is the rate of cooling of the wax.

According to the invention the wax is solidified in a mould which is refrigerated.

The wax may be melted by raising its temperature to its melting point but no higher.

The mould may be refrigerated using chilled fluid (e.g. water), for example by passing the chilled fluid around the mould or through passages in the mould. The fluid may have a temperature in the range 0° to 15° centigrade, but it is preferred that the temperature is in the range 5° to 10° centigrade and a particularly suitable temperature has been found to be 7° centigrade.

It is preferred that after the wax has been cooled it is again heated, for example to within 1° centigrade of its melting point. The wax may be heated by applying fluid (e.g. water) to the mould. The fluid may be at a temperature which is less than the melting temperature of the wax and it is preferred that the temperature of the fluid is 1° centigrade below the melting temperature of the wax.

It is further preferred that after the wax has again been heated, it is subjected to pressure, for example by compressing it in the mould, or in another mould.

The invention also provides paraffin wax which has been melted and then cooled in a refrigerated mould.

It has been estimated that the treatment to which the wax is subjected by the method according to the invention varies the spacing between layers of molecules, and accordingly, the invention further provides a paraffin wax comprising an assembly of molecules stacked together in layers, having been increased by heat treatment. For a wax having a melting point in the range 62° C. to 66° C., the pitch may be increased to above 36.5 Angstrom units. The thickness of each layer or the pitch of the stacking may lie in the range 38 to 39 Angstrom units, for example it may be 38.7 Angstrom units.

The invention also provides a machine for moulding articles from paraffin wax comprising a forming mould for receiving molten wax, and means to refrigerate the mould. Preferably there are a plurality of forming moulds. There may be fluid flow passages within each mould and means to pass refrigerated fluid (e.g. water) through the passages.

It is preferred that the machine includes means to pass heated fluid (e.g. water) through the fluid flow passages.

It is also preferred that the machine includes means to compress the wax. The machine may have a transfer mould to which articles solidified and softened in a forming mould may be transferred, there being means to compress an article in the transfer mould. There may be a plurality of transfer moulds.

The or each forming mould may comprise an open topped chamber with a vertically movable base portion, and the or each transfer mould may comprise an open bottomed chamber with a vertically movable top portion.

An article may be transferable from a forming mould to a transfer mould by arranging the transfer mould above the forming mould and raising the base portion of the forming mould to push the article upwardly into the transfer mould.

An article may be compressed in a transfer mould by arranging the transfer mould on a base member and moving the top portion of the transfer mould downwardly to compress the article between the top portion and the base member.

Preferably a forming mould is movable between a refrigeration station, a heating station, and a transfer station. A mould may be mounted on a turntable for rotary movement from station to station.

A transfer mould may be movable between the transfer station and a pressing station. A transfer mould may be arranged for linear movement between the transfer station and the pressing station along a line which extends radially of the axis of rotation of the turntable.

A transfer mould may be movable beyond the pressing station to an ejection station where the top portion of the or each transfer mould may be moved downwardly to push an article out of the mould. The article may tend to stick to the face of the top portion in which case means may be provided for removing the article from the face of the top portion.

The machine is preferably such that the temperature of the refrigerated fluid and/or the temperature of the hot fluid and/or the pressure at which articles are compressed, can be varied.

A forming mould and the or each transfer mould preferably has a cylindrical side wall and a cylindrical core so that articles may be produced with a uniform annular cross-section. Preferably the cylindrical side wall and/or the cylindrical core have fluid flow passages therethrough. It is further preferred that the cylindrical side wall comprises, or is sheathed or otherwise surrounded by, heat insulating material so that the temperature of the mould may be more easily controlled.

BRIEF DESCRIPTION OF THE DRAWINGS

FIG. 3 is a schematic representation of one forming mould of the machine; and

FIG. 4 is a cross-section through an alternative form of wax supply tank.

DESCRIPTION OF A PREFERRED EMBODIMENT OF THE INVENTION

Figure 1:
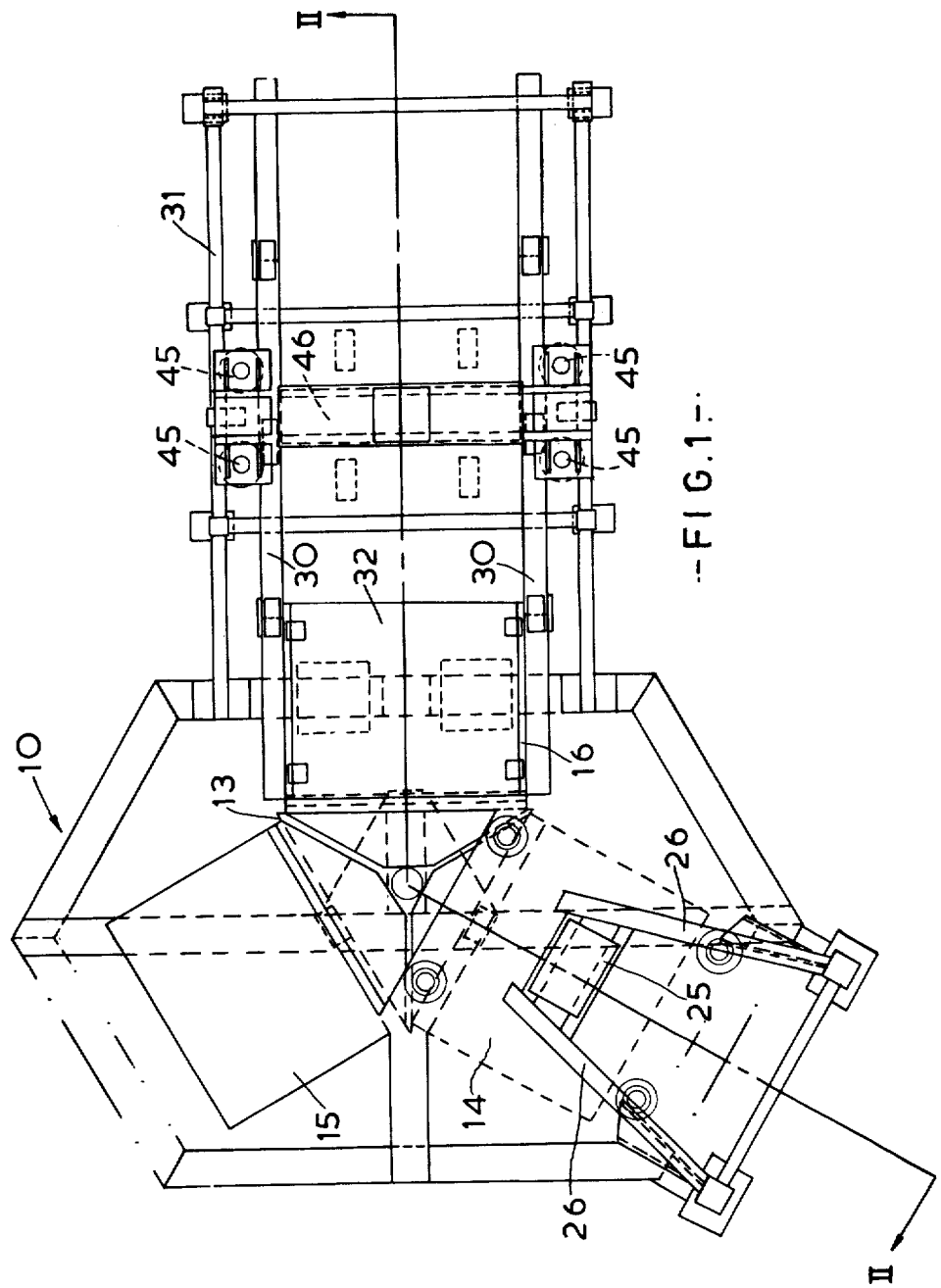
FIG. 1 is a plan view of one embodiment of a machine according to the invention.
Figure 2:
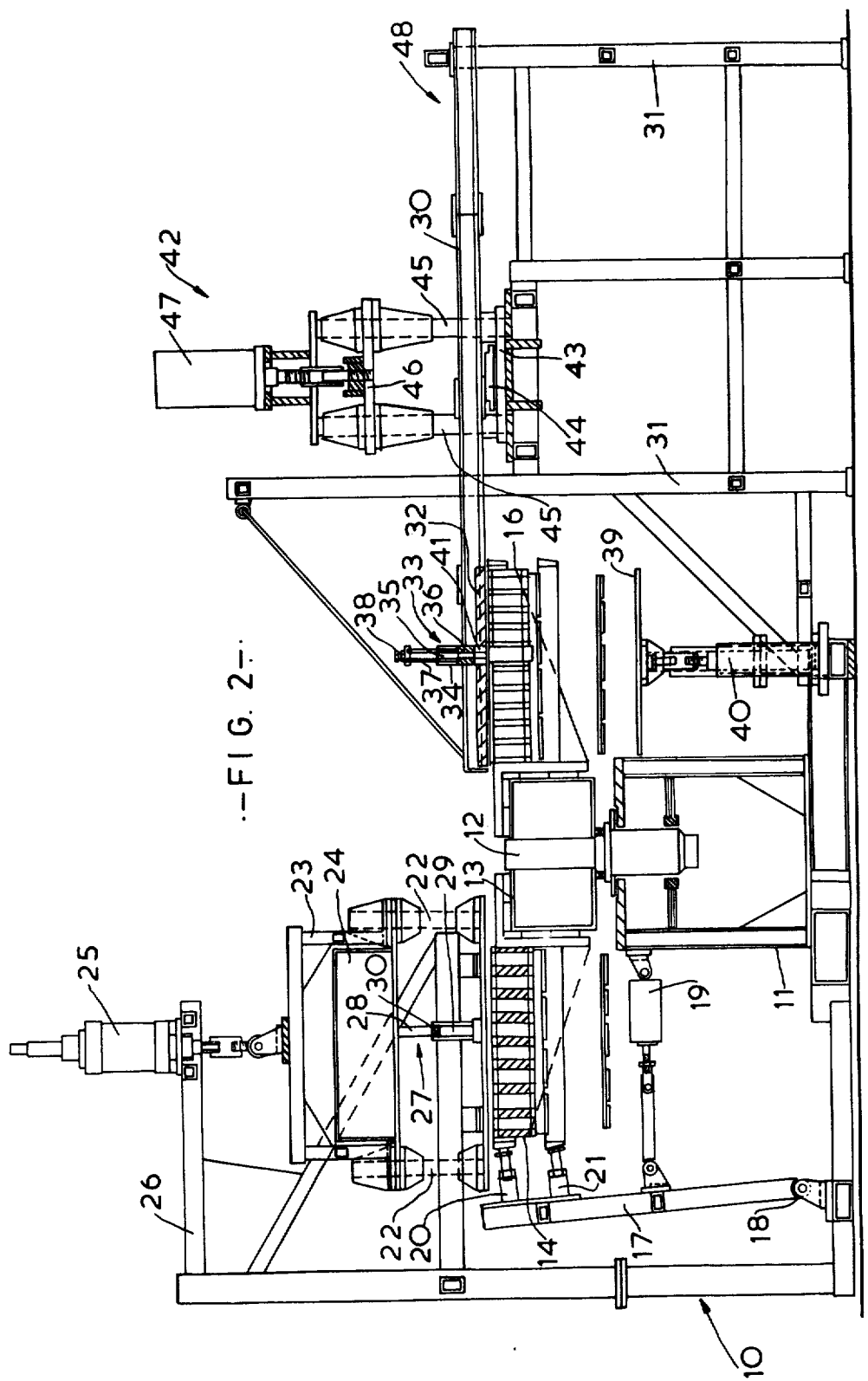
FIG. 2 is a section on line II—II of FIG. 1.

Referring first to FIGS. 1 to 3, the machine has a main frame 10, with an upstanding pedestal 11. The pedestal supports a vertical spindle 12 on which a triangular turntable 13 is rotatably mounted.

Respectively mounted on the three faces of the triangular turntable are three forming mould blocks 14, 15, 16.

Each mould block comprises eight parallel rows of eight moulds, so that there are sixty-four individual forming moulds in each block. One such mould is represented schematically in FIG. 3. The mould defines an annular cylindrical mould space 50. The radially outer boundary of this space is defined by two concentric sleeves 51, 52 sealed together at their ends except for an upper entry aperture 53 and a lower exit aperture 54. The radially inner boundary of the mould space is defined by a pair of concentric tubes 55, 56. The tube 55 is closed at its upper end but has an inlet conduit 57 at its lower end. The tube 56 is shorter than the tube 55 and has an exit conduit 58 at its lower end. This conduit 58 passes through a hole in the wall of the tube 55 and is sealed to the wall around the edges of this hole. Slidable within the mould space is an annular cylindrical piston 59. The piston has radial dimensions which correspond to the radial dimensions of the mould space but the axial dimension of the piston is substantially smaller than that of the mould space. Depending from the piston are two rods 60, 61, arranged at diametrically opposed positions. Secured to the lower end of the rods is an abutment plate 62.

Each forming mould, between the levels indicated in broken lines in FIG. 3, is mounted in the mould block. The body of the block is of metal, for example aluminium, but between the metal and the outer metal sleeve 51 of each mould is a heat insulating sleeve of rubber (not shown).

The temperature of the mould may be controlled by passing hot or cold water through the entry aperture 53 and inlet conduit 57, so that water will flow down the space between the sleeves 51, 52 and out of the aperture 54, and water will also flow up the tube 55, down the tube 56, and out of the exit conduit 58. The moulds are interconnected such that water may be supplied at a single inlet on the mould block, will circulate through all sixty-four moulds, and emerge at another single outlet on the mould block.

In the position shown in FIG. 1 the mould 14 is at a refrigeration station. A sub-frame 17 is pivoted at 18 to the main frame at the refrigeration station. The sub-frame is pivotable towards and away from the block 14 by the action of a double acting pneumatic ram 19 connected between the mid-point of the sub-frame 17 and the pedestal 11. The sub-frame carries two fluid connectors 20, 21. When the block 14 is in the position shown and the sub-frame 17 is pivoted towards the block the connectors 20, 21 respectively push open inlet and outlet valves on the block and sealingly engage with the inlet and outlet of the block. The fluid connectors are connected to a source of refrigerated water (not shown) so that the water can be pumped through the mould block, refrigerating each mould.

At the refrigeration station vertical guide columns 22 are secured to the main frame above the mould block 14. Slidable on these columns is a frame 23 carrying a wax supply tank 24. The frame 23 and the tank can be raised and lowered by a pneumatic piston and cylinder combination 25 connected to the frame 23 and mounted on overhead cantilever beams 26. A plurality of passages lead downwardly from the tank 24, one passage for each mould, and each passage leads to a point immediately above the associated mould. Only one passage 27 is shown, for the sake of simplicity. The passage is defined by a telescopic arrangement of two tubes 28, 29, the upper tube being fixed to the tank 24 and the lower tube being rigidly fixed to the main frame. A valve arrangement 30 ensures that when the tank 24 is in the raised position shown the upper and lower tubes are not in communication. When the tank is lowered using the piston and cylinder combination 25 however, the valve arrangement opens and molten wax flows from the tank 24 through the tubes 28 and 29 and into each forming mould, through the open top of the mould.

In the position shown in FIG. 1 the mould block 15 is at a heating station. A ram-operated sub-frame (not shown but identical to sub-frame 17) is mounted at the heating station and is operable to pass hot water through the mould block 15.

Also in the position shown in FIG. 1 the mould block 16 is at a transfer station. From the transfer station a pair of parallel horizontal rails 30 extend away from the pedestal 11 in a direction which is radial to the spindle 12. The rails are supported on an extension 31 of the main frame 10.

Slidable along the rails 30 is a transfer mould block 32. The mould block has eight rows of eight transfer moulds, one for each forming mould of the block 16. For simplicity only one transfer mould 33 is shown, and it comprises and open bottomed cylindrical sleeve 34 with a solid cylindrical core 35 and a vertically movable upper wall in the form of an annular piston 36. Connected to the piston is an upwardly extending tubular piston rod 37 with an air inlet nozzle 38 at its upper end.

Mounted at the transfer station below the mould blocks is a lift platform 39 powered by a pneumatic ram 40 connected to the main frame. Solidified wax rings are transferred to the transfer mould when the transfer moulds are in registration with the forming moulds as shown, by raising the platform 39 to push the abutment plates 62 of the forming moulds upwardly, hence raising the forming mould pistons 59 and driving the wax rings into the transfer mould. One wax ring 41 is shown in the transfer mould.

Intermediate the ends of the rails 30 is a pressing station 42. A bolster 43 is secured to the frame extension 31 and carries a fixed lower press platen 44. Four guide columns 45 extend upwardly from the bolster and an upper press platen 48 is slidably mounted on the columns. Movement of the upper platen is controlled by a pneumatic ram 47 mounted at the top of the columns 45. The upper and lower platens are of sufficient length to extend across the entire width of the transfer mould block and are sufficiently wide to cover two rows of transfer moulds.

Beyond the pressing station there is an ejection station 48 where there is means (not shown) to push the transfer mould pistons 36 downwardly and to connect a source of compressed air to the inlet nozzles 38.

In operation the turntable 13 rotates clockwise (as viewed in FIG. 1) periodically in 120° steps and each forming mould block in turn receives a charge of molten wax in each of its forming moulds while the mould block is chilled by circulation of refrigerated water. The wax rapidly solidifies in the form of rings and at the next station the solidified wax is softened by the passage of hot water through the mould block. At the third station the softened wax rings are transferred to the transfer mould blocks. Subsequently the transfer mould is moved along the rails 30 by means not shown, until the first two rows of transfer moulds lie under the upper press platen 44. The press platen is then lowered to engage sixteen of the nozzles 38 and hence depress sixteen of the pistons 36, compressing sixteen wax rings against the lower platen 44. The remainder of the wax rings are subsequently compressed, two rows at a time, and the transfer mould then moves to the ejection station 48 where the pistons 36 are depressed further to push the wax rings out of the transfer moulds. Since the wax rings tend to stick to the lower face of the pistons compressed air is blown through the hollow piston rods 37 via the nozzles 38. The compressed air passes through passages (not shown) in the piston 36 to the lower face of each piston and blows the wax rings off the pistons. A receiving tray or removal conveyor (not shown) is arranged below the ejection station to catch the finished wax rings.

The use of a turntable and three forming mould blocks ensures that each of the refrigeration, heating and transfer stations is in use substantially all the time. While one block is being refrigerated and is receiving wax another block is being heated and the third block is having its wax rings removed, pressed and ejected.

One use for wax rings prepared using the machine and method of the above example is in the lubrication of yarns for knitting. A conventional method of preparing wax rings for use in the lubrication of yarns for knitting involves melting wax, pouring the wax into moulds, and allowing the wax to cool under ambient temperature conditions. A sample of wax rings prepared using the method of the invention has been found to give improved results compared with known wax rings, in that yarns lubricated using wax rings according to the invention have exhibited less frictional resistance when passing through knitting yarn guides and needles than yarns lubricated using known wax rings.

The said sample of wax rings was prepared from a paraffin wax having a melting point of 62°–66° C., indicating that the wax was of heterogeneous composition, being made up of a range of different hydrocarbons. The wax was heated to a temperature of 66° C. and then poured into moulds refrigerated by water at a temperature of 7° C. After the wax had hardened the moulds were heated with water at 61° C. and the softened wax rings were removed and compressed in a hand operated press.

Samples of wax removed from the rings were subjected to X-ray diffraction analysis, as were samples removed from known rings. The resultant X-ray reflections took the form of a series of concentric rings and from the intensity of the rings the following measurements were obtained:

|  | Known Wax | Wax according to the invention |
|---|---|---|
| Reflection A | 36.3 | 38.7 |
| Reflection B | 18.1 | 19.3 |
| Reflection C | 12.15 | 12.8 |
| Reflection D | 3.80 | 3.8 |
| Reflection E | 3.41 | 3.41 |

The measurements are in Angstrom units and relate to structural dimensions of the molecules making up the wax. It is believed that the wax consists of an assembly of molecular layers stacked together, single molecules running from one face of a layer to the other face. It is also believed that the figures for reflection A correspond to the repeat distance (or pitch) between successive layers of the wax. The zig-zag chain molecules may be arranged either perpendicular to the faces of the layers, in which case reflection A provides a measure of the actual length of each molecule, or inclined at a constant angle to the faces of the layer. It is probable that reflections B and C are the second and third order reflections of reflection A.

Since reflection A gives a significantly higher result for the wax according to the invention than for the known wax it is believed that the layer spacing that wax is greater than in conventional waxes. This may be because the bond angle between successive atoms in each molecular chain has increased, and/or because the angle of inclination of the molecules with respect to the layer faces has increased.

It is believed that reflections D and E, which are substantially identical for the two waxes tested, relate to the spacing between wax molecules in directions which are parallel to the faces of the wax layers.

Turning now to FIG. 4, there is shown an alternative form of wax supply tank 24a, which in use is mounted in a fixed position at the refrigeration station. Mounted within the tank are sixty-four metering tubes 70 extending upwardly from the base of the tank in eight rows of eight. The tubes are positioned so that when a mould block is at the refrigeration station, the sixty-four tubes 70 are in registration with the sixty-four forming moulds underneath. A valve-controlled outlet nozzle 71 extends downwardly from each tube 70.

A wax feed pipe 72 extends into the tank and the wax is maintained at a constant level which is just below the tops of the tubes 70, and is indicated by a dotted line 72.

To one side of the tubes 70 there is a wax displacement block 73 which is mounted on the piston rod 74 of an air cylinder 75. The air cylinder 75 is rigidly mounted on the top of the tank.

When it is desired to charge the moulds of a mould block, the wax displacement block 73 is lowered into the wax, by operation of the air cylinder 75, raising the wax level to a new level which is above the top of the tubes 70. The tubes 70 thus fill and wax and when they are full, the block 73 is raised again, lowering the wax level below the tops of the full tubes 70. Each tube contains the same quantity of wax and this is now transferred to the mould below by opening the associate valve 71. The process can then be repeated when the next mould block is positioned below the tank.

It will be seen that the quantity of wax which is metered into each mould is dependent on the capacity of the tubes 70. In order to permit wax rings of different sizes to be produced, means are provided for altering the capacity of the tubes 70, and hence altering the quantity of wax fed to the moulds. These means comprises sixty-four plungers 76, one for each tube 70, all the plungers being mounted on a common support platform 77. Movement of the platform 77 is controlled by a second air cylinder 78, the platform being connected to the piston rod 79 of the cylinder. The capacity of the tubes 76 varies according to how far the plungers project into the tubes 70 so by varying the height of the platform 77, the size of the wax rings porduced can be varied.

The invention is not restricted to the details of the foregoing examples. For instance, it is not essential to have three forming block moulds. There may be one, two, four or more blocks. Furthermore, it is not essential that water be used to refrigerate and heat the mould blocks. Other heat conveying fluids may be used.

The articles may be moulded from wax with the application of pressure but without refrigeration.

It is not essential to use a wax having a melting point in the range 62° C. to 66° C. Waxes may for example be used having from 20 carbon atoms per molecule (melting point from 120° F. to 125° F.) to 40 carbon atoms per molecule (melting point from 150° F. to 155° F.) or from a combination of such waxes.

We claim:

1. The molded wax article capable of imparting enhanced lubricity to textile yarns and consisting of a body of paraffin wax having a melting temperature in the range of from 62° C. to 66° C. and a molecular structure of layers spaced at a distance greater than 36.5 angstrom units as measured by X-ray diffraction analysis.

* * * * *